United States Patent
Cohen et al.

(10) Patent No.: US 7,937,447 B1
(45) Date of Patent: May 3, 2011

(54) COMMUNICATION BETWEEN COMPUTER SYSTEMS OVER AN INPUT/OUTPUT (I/O) BUS

(75) Inventors: Ariel Cohen, Cupertino, CA (US);
Shreyas Shah, San Jose, CA (US);
Raymond Lim, Los Altos Hills, CA (US); Greg Lockwood, Redwood City, CA (US)

(73) Assignee: Xsigo Systems, Mountain View, CA (US)

( * ) Notice: Subject to any disclaimer, the term of this patent is extended or adjusted under 35 U.S.C. 154(b) by 1360 days.

(21) Appl. No.: 11/086,117

(22) Filed: Mar. 21, 2005

Related U.S. Application Data

(60) Provisional application No. 60/590,450, filed on Jul. 22, 2004.

(51) Int. Cl.
G06F 15/167 (2006.01)
G06F 13/36 (2006.01)

(52) U.S. Cl. ........ 709/212; 709/213; 709/216; 709/217; 709/227; 709/238; 709/245; 709/248; 710/22; 710/26; 710/27; 710/28; 710/33; 710/100; 710/120; 710/300; 710/305; 710/306; 710/307; 710/308; 710/309; 710/310; 710/311; 710/312; 710/313; 710/314; 710/315

(58) Field of Classification Search .......... 709/212–213, 709/216–217, 227, 238, 245, 248; 710/22, 710/26–28, 33, 100, 120, 300, 305–315
See application file for complete search history.

(56) References Cited

U.S. PATENT DOCUMENTS

| | | | |
|---|---|---|---|
| 5,815,675 A * | 9/1998 | Steele et al. ................. 710/113 |
| 5,898,815 A * | 4/1999 | Bluhm et al. .................. 710/45 |
| 6,003,112 A * | 12/1999 | Tetrick .......................... 711/100 |
| 6,247,086 B1 * | 6/2001 | Allingham ..................... 710/314 |
| 6,253,334 B1 * | 6/2001 | Amdahl et al. ................... 714/4 |
| 6,466,993 B1 * | 10/2002 | Bonola ............................ 710/1 |
| 6,594,329 B1 * | 7/2003 | Susnow ........................ 375/372 |
| 6,725,388 B1 * | 4/2004 | Susnow ........................ 713/400 |
| 6,931,511 B1 * | 8/2005 | Weybrew et al. ................ 712/4 |
| 6,963,946 B1 * | 11/2005 | Dwork et al. ................. 710/310 |
| 7,046,668 B2 * | 5/2006 | Pettey et al. .................. 370/392 |
| 7,096,308 B2 * | 8/2006 | Main et al. .................... 710/315 |
| 7,103,064 B2 * | 9/2006 | Pettey et al. .................. 370/463 |
| 7,143,227 B2 * | 11/2006 | Maine .......................... 710/306 |
| 7,159,046 B2 * | 1/2007 | Mulla et al. ..................... 710/9 |
| 7,188,209 B2 * | 3/2007 | Pettey et al. .................. 710/317 |
| 7,219,183 B2 * | 5/2007 | Pettey et al. .................. 710/316 |
| 7,260,661 B2 * | 8/2007 | Bury et al. .................... 710/106 |
| 7,281,077 B2 * | 10/2007 | Woodral ....................... 710/310 |

(Continued)

OTHER PUBLICATIONS

Figueiredo et al, "Resource Virtualization Renaissance", May 2005, IEEE Computer Society, pp. 28-31.

(Continued)

*Primary Examiner* — John Follansbee
*Assistant Examiner* — Saket K Daftuar
(74) *Attorney, Agent, or Firm* — Weaver Austin Villeneuve & Sampson LLP

(57) ABSTRACT

Methods and apparatus are provided for improving communication between processors in separate computer systems. Components and peripherals in individual computer systems communicate using input/output (I/O) buses such as PCI Express buses. The I/O buses are extended to allow interconnection between computer systems without having to introduce network infrastructure. A transfer controller supporting Direct Memory Access (DMA) is provided to allow even more efficient communication between computer systems.

23 Claims, 12 Drawing Sheets

U.S. PATENT DOCUMENTS

| | | | | |
|---|---|---|---|---|
| 7,345,689 B2* | 3/2008 | Janus et al. | | 345/520 |
| 7,346,716 B2* | 3/2008 | Bogin et al. | | 710/52 |
| 7,366,842 B1* | 4/2008 | Acocella et al. | | 711/118 |
| 7,457,897 B1* | 11/2008 | Lee et al. | | 710/74 |
| 7,457,906 B2* | 11/2008 | Pettey et al. | | 710/316 |
| 7,609,723 B2* | 10/2009 | Munguia | | 370/473 |
| 2002/0065984 A1* | 5/2002 | Thompson et al. | | 711/114 |
| 2003/0126320 A1* | 7/2003 | Liu et al. | | 710/22 |
| 2004/0008713 A1* | 1/2004 | Knight et al. | | 370/428 |
| 2004/0123013 A1* | 6/2004 | Clayton et al. | | 710/310 |
| 2004/0172494 A1* | 9/2004 | Pettey et al. | | 710/305 |
| 2004/0179529 A1* | 9/2004 | Pettey et al. | | 370/392 |
| 2004/0233933 A1* | 11/2004 | Munguia | | 370/473 |
| 2004/0236877 A1* | 11/2004 | Burton | | 710/22 |
| 2005/0039063 A1* | 2/2005 | Hsu et al. | | 713/324 |
| 2005/0114569 A1* | 5/2005 | Bogin et al. | | 710/52 |
| 2005/0238035 A1* | 10/2005 | Riley | | 370/401 |
| 2006/0050693 A1* | 3/2006 | Bury et al. | | 370/389 |
| 2006/0193327 A1* | 8/2006 | Arndt et al. | | 370/395.21 |

OTHER PUBLICATIONS

Ajay V. Bhatt, "Creating a Third Generation I/O Interconnect", Intel ® Developer Network for PCI Express* Architecture, www.expresslane.org, pp. 1-11.

* cited by examiner

Figure 8

| Write Descriptor 811 | Owner 813 | Valid Number Of Bytes In Buffer 815 | Multicast Bitmap 821 |
| --- | --- | --- | --- |
| | | Pointer To Buffer 817 / SOM, MOM, EOM 819 | Buffer Length 823 |

| Write Completion Descriptor 831 | Owner 833 | Status 835 | Number Of Attempts 839 |
| --- | --- | --- | --- |
| | | Pointer To Memory 837 | |

Figure 9

Read Descriptor 911: Owner 913 | Pointer To Buffer 915 | Buffer Length 917

Read Completion Descriptor 931: Owner 933 | Pointer To Descriptor 937 | Status 935 — SOM, MOM, EOM 939 | Valid Number Of Bytes In Memory 941

COMMUNICATION BETWEEN COMPUTER SYSTEMS OVER AN INPUT/OUTPUT (I/O) BUS

CROSS-REFERENCE TO RELATED APPLICATIONS

This application claims priority from U.S. Provisional Patent Application No. 60/590,450 titled METHODS AND APPARATUS FOR RESOURCE VIRTUALIZATION, filed on Jul. 22, 2004 by Shreyas Shah, Subramanian Vinod, R. K. Anand, and Ashok Krishnamurthi, the entirety of which is incorporated by reference in its entirety for all purposes.

BACKGROUND OF THE INVENTION

1. Field of the Invention

The present invention relates to communication between computer systems. In one example, the present invention relates to methods and apparatus for allowing effective data transfer between computer systems over an input/output (I/O) bus interface.

2. Description of Related Art

Communication between processors on different computers such as servers and clients is typically achieved over a network interface. Each computer may include a network interface card that implements a standard network technology such as Token Ring, Ethernet, or InfiniBand or a proprietary technology such as Quadrics and Myrinet. Communication between computers such as servers and clients requires additional hardware including network interface cards, physical links, and network nodes. Different network technologies have different stacks that include the physical, link, network, and transport layers.

However, network communication can often be inefficient, unreliable, and insecure. Inefficiency is introduced by network interface cards, links, and network nodes. Processing at a network interface card associated with a network stack often delays communications between processors on different computers. For example, appropriate Transport Control Protocol (TCP) and Internet Protocol (IP) headers and fields are provided by a network interface card for data transmitted onto a network. The headers and fields then have to be removed by a network interface card upon receiving the data. Networks include links and network nodes such as switches and routers that may introduce substantial delay into transmissions.

Network communication can also be unreliable. Network interface cards can often fail, leading to connection downtime or inefficient redundancy schemes. Having network routers and switches connecting servers can also increase the number of possible failure points. Furthermore, a large number of redundant links are often needed to connect network entities. Communicating over networks such as Ethernet may also lack security. Although cryptographic algorithms are often used to communicate with external entities such as entities on an external network connected to the local area network, communication within the local area network is typically insecure.

Consequently, it is desirable to provide methods and apparatus for improving communication between processors in separate computer systems.

SUMMARY OF THE INVENTION

Methods and apparatus are provided for improving communication between processors in separate computer systems. Components and peripherals in individual computer systems communicate using input/output (I/O) buses such as PCI Express buses. The I/O buses are extended to allow interconnection between computer systems without having to introduce network infrastructure. A transfer controller supporting Direct Memory Access (DMA) is provided to allow even more efficient communication between computer systems.

In one embodiment, a technique for transferring data between computer systems using an I/O bus protocol is provided. An I/O bus connection is provided between at least a first computer system and a second computer system. A descriptor including a pointer to an address in a first computer system memory address space is provided. The address corresponds to the address of a data block. The data block is read from the first computer system memory address space into a second computer system memory address space over the I/O bus connection.

In another embodiment, a server is provided. The server include a processor, memory coupled to the processor, and an I/O bus interface. The I/O bus interface is configured to connect the server having a first memory address space to another server having a second memory address space using an I/O bus protocol. The I/O bus interface is configured to provide a descriptor including a pointer to an address in the first memory address space. The address corresponds to the address of a data block in memory coupled to the processor.

A further understanding of the nature and advantages of the present invention may be realized by reference to the remaining portions of the specification and the drawings.

BRIEF DESCRIPTION OF THE DRAWINGS

The invention may best be understood by reference to the following description taken in conjunction with the accompanying drawings, which are illustrative of specific embodiments of the present invention.

FIG. 8 is a diagrammatic representation showing read and write descriptors.

FIG. 9 is a diagrammatic representation showing read and write completion descriptors.

DETAILED DESCRIPTION OF SPECIFIC EMBODIMENTS

Figure 1:
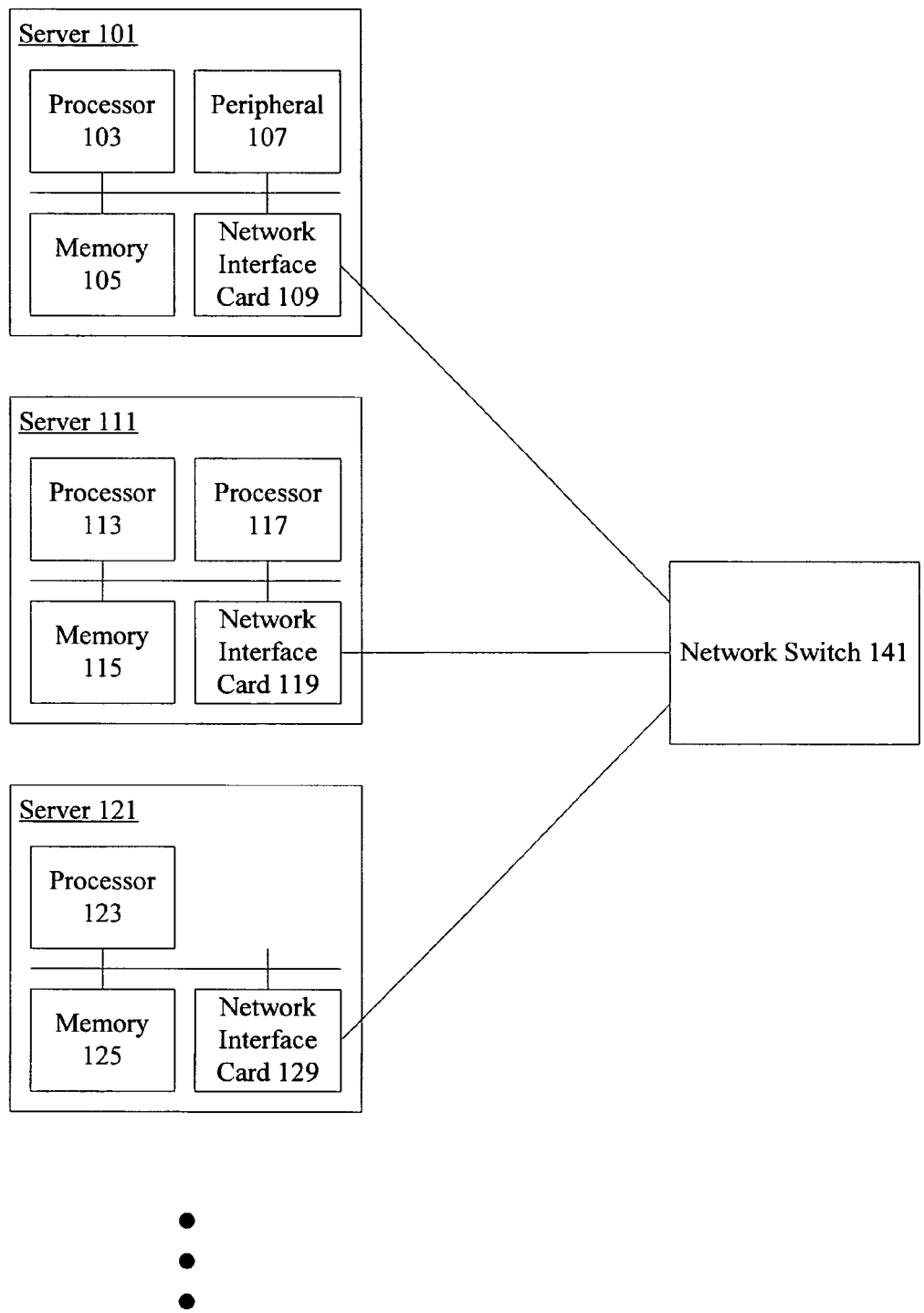
FIG. 1 is a diagrammatic representation showing a typical implementation for communication between servers.

Reference will now be made in detail to some specific examples of the invention including the best modes contemplated by the inventors for carrying out the invention.

Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of Peripheral Control Interface (PCI) Express and Direct Memory Access (DMA). However, it should be noted that the techniques of the present invention can be applied to a variety of different standards and variations to PCI Express and DMA. In the following description, numerous specific details are set forth in order to provide a thorough understanding of the present invention. The present invention may be practiced without some or all of these specific details. In other instances, well known process operations have not been described in detail in order not to unnecessarily obscure the present invention.

Furthermore, techniques and mechanisms of the present invention will sometimes be described in singular form for clarity. However, it should be noted that some embodiments can include multiple iterations of a technique or multiple instantiations of a mechanism unless noted otherwise. For example, a processor is used in a variety of contexts. However, it will be appreciated that multiple processors can also be used while remaining within the scope of the present invention unless otherwise noted.

A server or computing system generally includes one or more processors, memory, as well as other peripheral components and peripheral interfaces such as hardware accelerators, network interface cards (NIC), host bus adapters (HBA), graphics accelerators, disks, etc. A processor can communicate with a variety of entities. In some examples, a processor can communicate with other components in the same computer system using an I/O bus. Any system including one or more processors configured to operate on a memory address space is referred to herein as a server, computer, computer system, host, or client. The memory address space may be physical or virtual and may be divided into separate kernel and application address spaces. In a computer system having more than one processor, the multiple processors have access to the shared physical or virtual address space.

However, each processor can own cache lines associated with a portion of the address space. Processors can probe and perform operations such as reads and writes on particular memory lines. Components and interfaces may also be assigned portions of an address space. Components, interfaces, and processors communicate using an I/O bus. Any mechanism allowing communication between components in a computer system is referred to herein as an I/O bus or a bus. Examples of buses include PCI, PCI Express, Vesa Local Bus (VLB), PCMCIA, and AGP. Various components and/or applications may also be assigned portions of a memory address space and are generally restricted to only assigned portions of the address space. The restriction prevents malicious applications and devices from interfering with other applications and devices.

The processor and an associated operating system have access to a kernel address space. When a device such as a network card is transferring data into memory of a computer system, the processor may be required to copy data into and out of the kernel address space. Several techniques including polling and I/O interrupts are often used to involve the processor. Although polling and interrupts work well for lower bandwidth devices, both polling and interrupt-driven transfers put the burden of moving data and managing the transfer on the processor. When large or frequent data transfers occur, system performance can be adversely impacted.

Direct Memory Access (DMA) allows efficient data transfers over an I/O bus without requiring involvement from the processor. An interrupt mechanism is still used to trigger processor involvement, but when an I/O transfer completes or an error occurs. DMA can allow data to be sent directly from a device such as a disk drive without any need to perform additional data copies. The processor is freed from involvement with the data transfer allowing for more efficient computer operation. Some devices that may support DMA include hard drives, network cards, and graphics cards.

DMA has conventionally allowed a processor to communicate with other devices in a computer system. A processor can also communicate with external entities such as processors on other computer systems. Communication between processors on different computers such as servers and clients is typically achieved over a network interface.

Communication between computers such as servers and clients requires additional hardware including network interface cards, physical links, and network nodes. However, communication over a network can often be inefficient, unreliable, and insecure. Inefficiency is introduced by network interface cards, links, and network nodes. Processing at a network interface card associated with a network stack often delays communications between processors on different computers. For example, appropriate Transport Control Protocol (TCP) and Internet Protocol (IP) headers and fields are provided by a network interface card for data transmitted onto a network. The headers and fields then have to be removed by a network interface card receiving the data. Networks include links and network nodes such as switches and routers that may introduce substantial delay into transmissions.

Network communication can also be unreliable. Network interface cards can often fail, leading to connection downtime or inefficient redundancy schemes. Having network routers and switches connecting servers can also increase the number of possible failure points. Furthermore, a large number of redundant links are often needed to connect network entities. Communicating over networks such as Ethernet can also be insecure as providing cryptography accelerators within each individual server can be relatively expensive.

Existing limitations have led to the development of new I/O buses including PCI Express. PCI Express is a low-cost, scalable, switched, point-to-point, serial I/O interconnection scheme that maintains backward compatibility with PCI. The PCI Express architecture is specified using an Open System Interconnection (OSI) layer model and uses a load-store addressing architecture with a flat address space to allow interoperability with existing PCI applications. The software layers generate read and write requests that are transported by the transaction layer to the I/O devices using a packet-based, split-transaction protocol. The link layer adds sequence numbers and CRC to these packets to create a highly reliable data transfer mechanism.

The basic physical layer includes a dual simplex channel that is implemented as a transmit pair and a receive pair. PCI Express used with the techniques of the present invention provides support for quality of service (QoS), power management, and I/O virtualization. Quality of service and power management improve data integrity and allow control of power consumption. Although the techniques of the present invention will be described in the context of PCI Express, it should be recognized that the techniques of the present invention are not limited to PCI Express and indeed are applicable to other standards and variations to standards such as RapidIO, Serial RapidIO, InfiniBand, etc.

PCI Express is typically used as an I/O interconnect for communication between processors and I/O controllers within a computer, and communication between processors on different computers remains the province of network interface cards that implement a networking technology such as Ethernet or InfiniBand.

However, the techniques and mechanisms of the present invention recognize that I/O buses such as PCI Express can be used for cluster communication without having to introduce network infrastructure. Any communication between separate computer systems is referred to herein as cluster communication. The techniques and mechanisms of the present invention further recognize that making efficient use of an I/O bus such as PCI Express for communication between separate computer systems entails a direct memory access capability such as DMA. Although DMA controller designs for communication between a processor and components in a computer system are available, the techniques of the present invention provide an efficient direct memory access controller design for communication between processors in separate computer systems.

FIG. 1 is a diagrammatic representation showing a conventional implementation for communication between servers. Server 101 includes a processor 103, a peripheral 107, memory 105, and a network interface card 109. The processor 103 communicates with other components and interfaces in the system using an I/O bus and associated I/O controllers. In typical implementations, communications between components and interfaces in server 101 occur over an I/O bus such as PCI. Server 111 includes processors 113 and 117, memory 115, and network interface card 119. Communication within server 111 similarly occurs over one or more I/O buses. Server 121 includes a processor 123, memory 125, and network interface card 129. In order to allow communication between servers, network interfaces are provided.

In one example, network interface cards 109, 119, and 129 allow use of an Ethernet network. Network interface cards 109, 119, and 129 are coupled to a network node such as a network switch 141. Although a network interface card is described, other network interfaces including Host Bus Adapters (HBAs), Small Computer Systems Interface Over Internet TCP/IP Offload Engine (iSCSI TOE), or serial ATA (SATA) interfaces can also be used. The network interfaces allow connection to Ethernet switches, Fibre Channel switches, appliances, and mainframe or keyboard, video, mouse (KVM) switches.

By using network interfaces, latency is introduced as data is processed in a manner specified by a network stack during transmission and receipt of the data. For example, TCP and IP headers and fields are added to data before transmission to provide appropriate addresses, sequence numbers, etc. In one example, sequence numbers are added to allow for retransmission in the event that packets are dropped. The techniques of the present invention recognize that I/O buses such as PCI Express buses use packet mechanisms that allow for retransmission at the bus level. I/O buses such as PCI Express buses further provide a number of features conventionally provided only by network technologies. Consequently, the techniques and mechanisms of the present invention contemplate using an I/O bus such as a PCI Express bus to connect separate computer systems and to allow efficient data transfers between computer systems.

Figure 2:
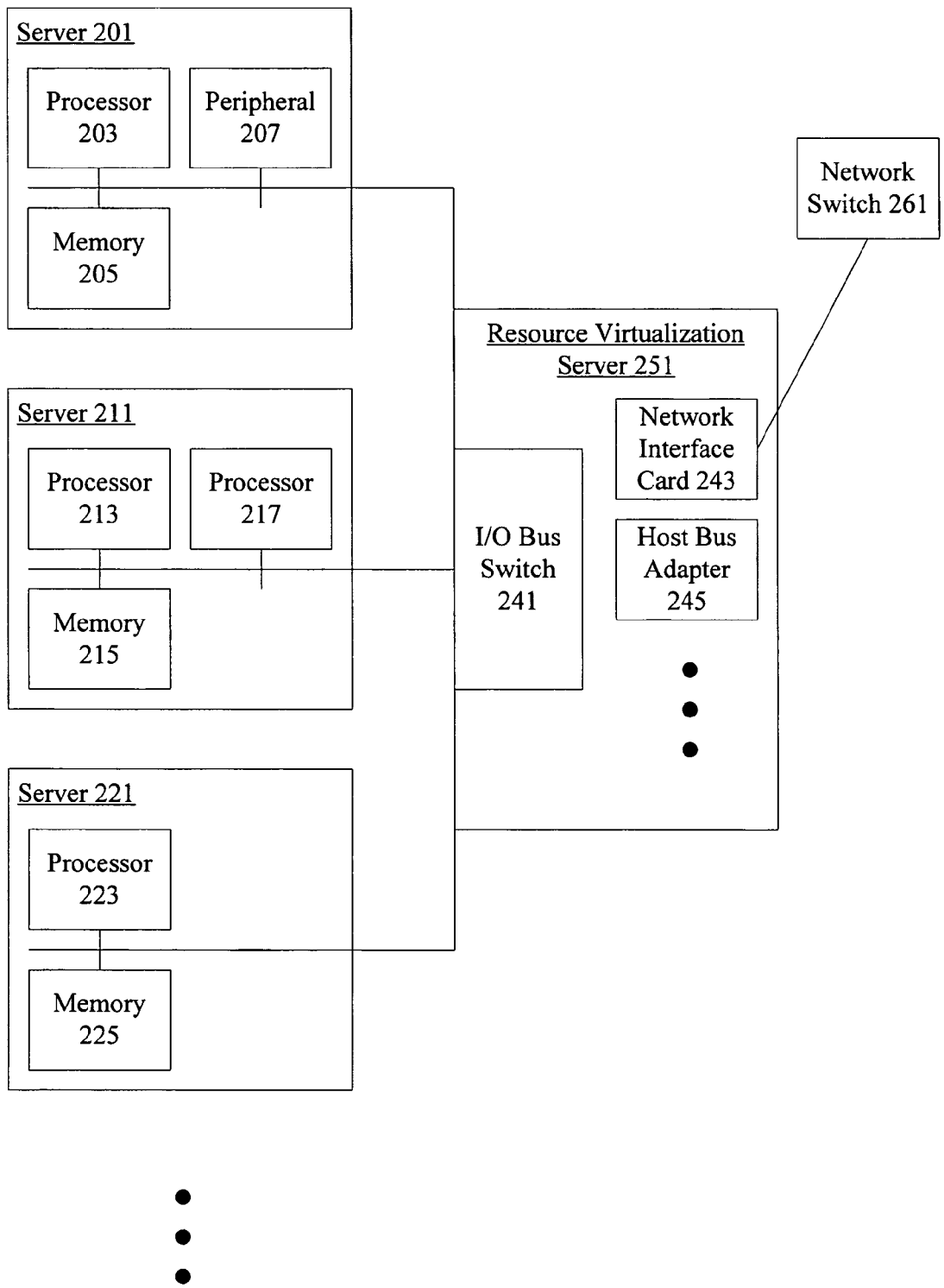
FIG. 2 is a diagrammatic representation showing multiple servers interconnected using a bus protocol.

FIG. 2 is a diagrammatic representation showing separate servers connected using an I/O bus. Server 201 includes processor 203, memory 205, and peripheral 207. Server 211 includes processor 213 and 217 and memory 215. Server 221 includes only processor 223 and memory 225. Components and peripherals in each server 201, 211, and 221 are connected using one or more I/O buses. According to various embodiments, the I/O bus is extended to allow interconnection with other servers through an I/O bus interconnect such as an I/O bus switch 241. In one example, server 201 no longer uses addresses such as MAC addresses associated with a MC to communicate with other servers but instead is configured to read and write data into memory associated with a connected server.

An I/O bus switch 241 may be a standalone entity, integrated within a particular server, or provided with a resource virtualization server 251. According to various is embodiments, components such as NICs and HBAs can be offloaded from servers 201, 211, and 221 onto a resource virtualization server 251. The resources including NIC 243 and HBA 245 are maintained in a shared and virtualized manner on a resource virtualization server 251. Links can be provided between the resource virtualization server and external switches such as network switch 261. According to various embodiments, a series of servers is connected to the resource virtualization server using a PCI Express bus architecture. In some cases, a PCI Express bridge is used to increase compatibility with some existing systems. However, a PCI Express bridge is not necessarily needed. By using a resource virtualization server, the number of resources and links can be significantly reduced while increasing allocation efficiency.

Figure 3:
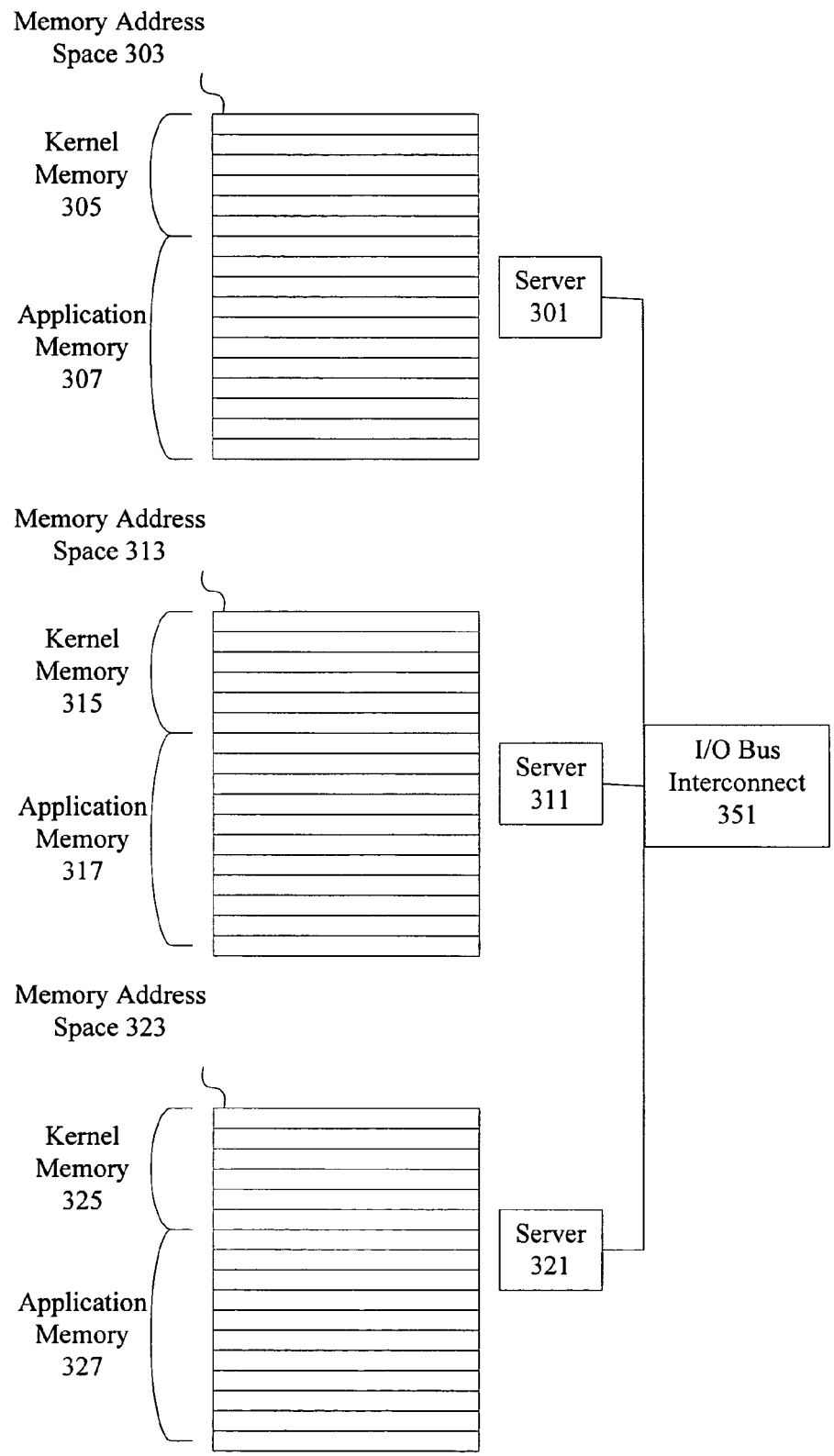
FIG. 3 is a diagrammatic representation showing multiple servers having separate address spaces.

FIG. 3 is a diagrammatic representation showing separate servers each associated with a memory address space. According to various embodiments, server 301 includes a memory address space 303 with kernel memory 305 and application memory 307. The memory address space 303 may be a physical memory address space or a virtual memory address space. Server 301 may include one or more processors with access to the memory address space. Server 311 includes a memory address space 313 with kernel memory 315 and application memory 317. The memory address space 313 may be a physical memory address space or a virtual memory address space. Server 311 may include one or more processors with access to the memory address space. Server 321 includes a memory address space 323 with kernel memory 325 and application memory 327. The memory address space 323 may be a physical memory address space or a virtual memory address space. Server 321 may include one or more processors with access to the memory address space.

According to various embodiments, the separate servers 301, 311, and 321 are connected using an I/O bus. In one embodiment, an I/O bus interconnect 351 such as an I/O bus switch is used to connect the separate servers. The I/O bus interconnect 351 is associated with logic that allows aggregation of the memory address spaces 303, 313, and 323. Any logical address space that includes the memory address spaces of multiple computer systems or servers is referred to herein as an aggregated memory address space. In one embodiment, an aggregated memory address space is managed by an I/O bus switch or by a resource virtualization server. Each server 301, 311, and 321 may be embodied in separate computer cases. In other examples, each server may be embodied in a card, a blade, or even a single integrated circuit (IC) device or portion of an IC device.

Techniques for performing interconnection can be implemented on one or more application specific integrated circuits (ASICs) and/or programmable logic devices (PLDs). The entire interconnection mechanism can be provided on a server, a card, a chip, or on a processor itself. Each server 301 is conventionally configured to communicate with other servers using a network technology involving a network stack and network infrastructure. However, the techniques of the present invention allow communication without a network stack and network infrastructure.

Figure 4:
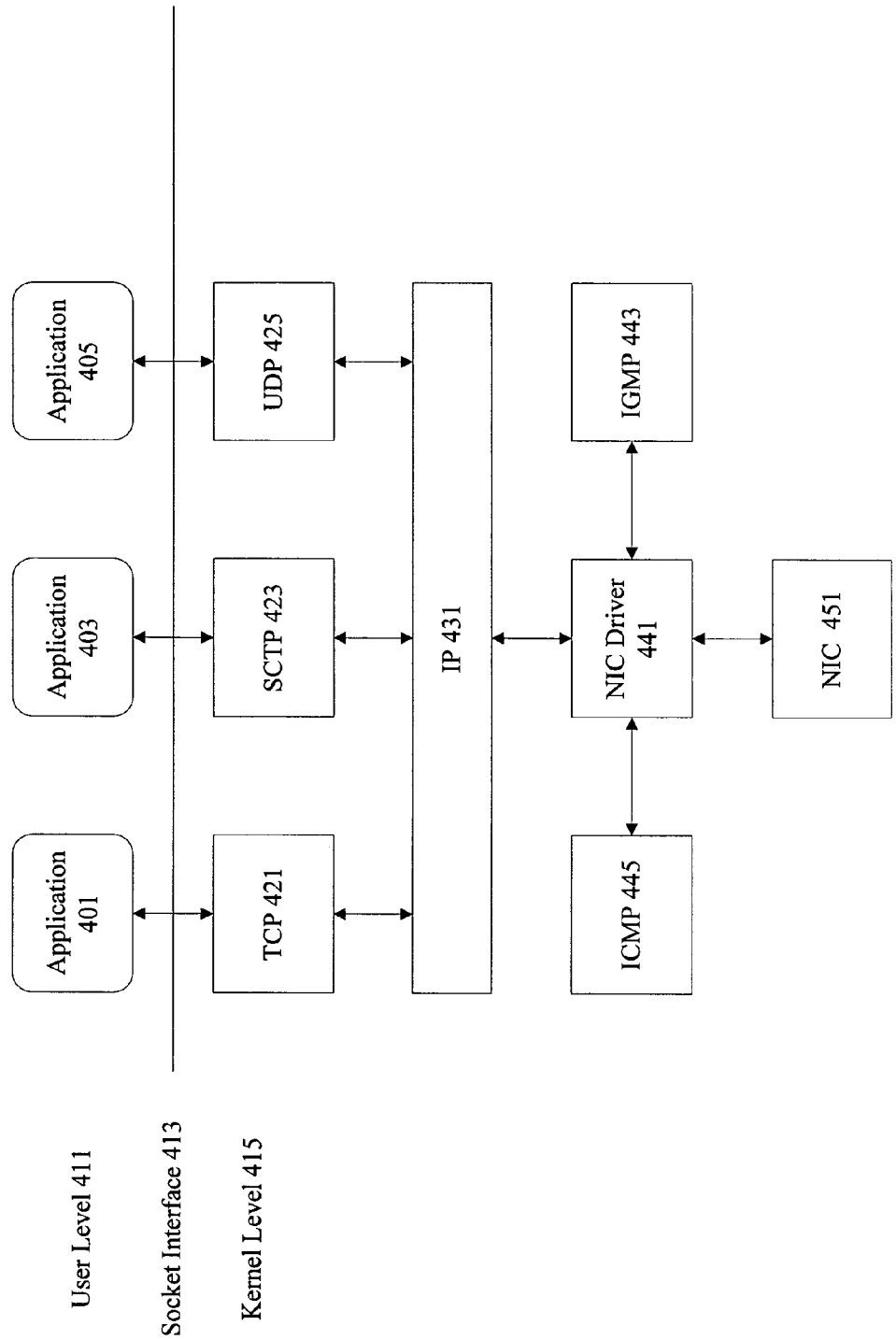
FIG. 4 is a diagrammatic representation depicting a typical layer model for transmission over a bus protocol.

FIG. 4 is a diagrammatic representation showing one example of a typical software architecture for network communications. A user level 411 includes multiple applications 401, 403 and 405. The user level 411 is coupled to a kernel level 415 through a socket interface 413. Residing at the kernel level are various transport layer protocols such as a transport control protocol (TCP) 421, user datagram protocol (UDP) 425, and Stream Control Transmission Protocol (SCTP) 423.

In some examples, the transport layer protocols use the network layer Internet Protocol (IP) 431 associated with a device driver. The device driver may be a network interface card (NIC) driver 441 associated with the Internet Control Message Protocol (ICMP) 445 and the Internet Group Management Protocol (IGMP) 443. The device driver 441 is configured to allow kernel access to a peripheral such as a network interface card (MC). In typical implementations, the MC is included as a component on the server. However, including a resource such as a NIC on a server can be inefficient. Furthermore, allowing communication only after data has been processed using a network stack is also inefficient.

Figure 5:
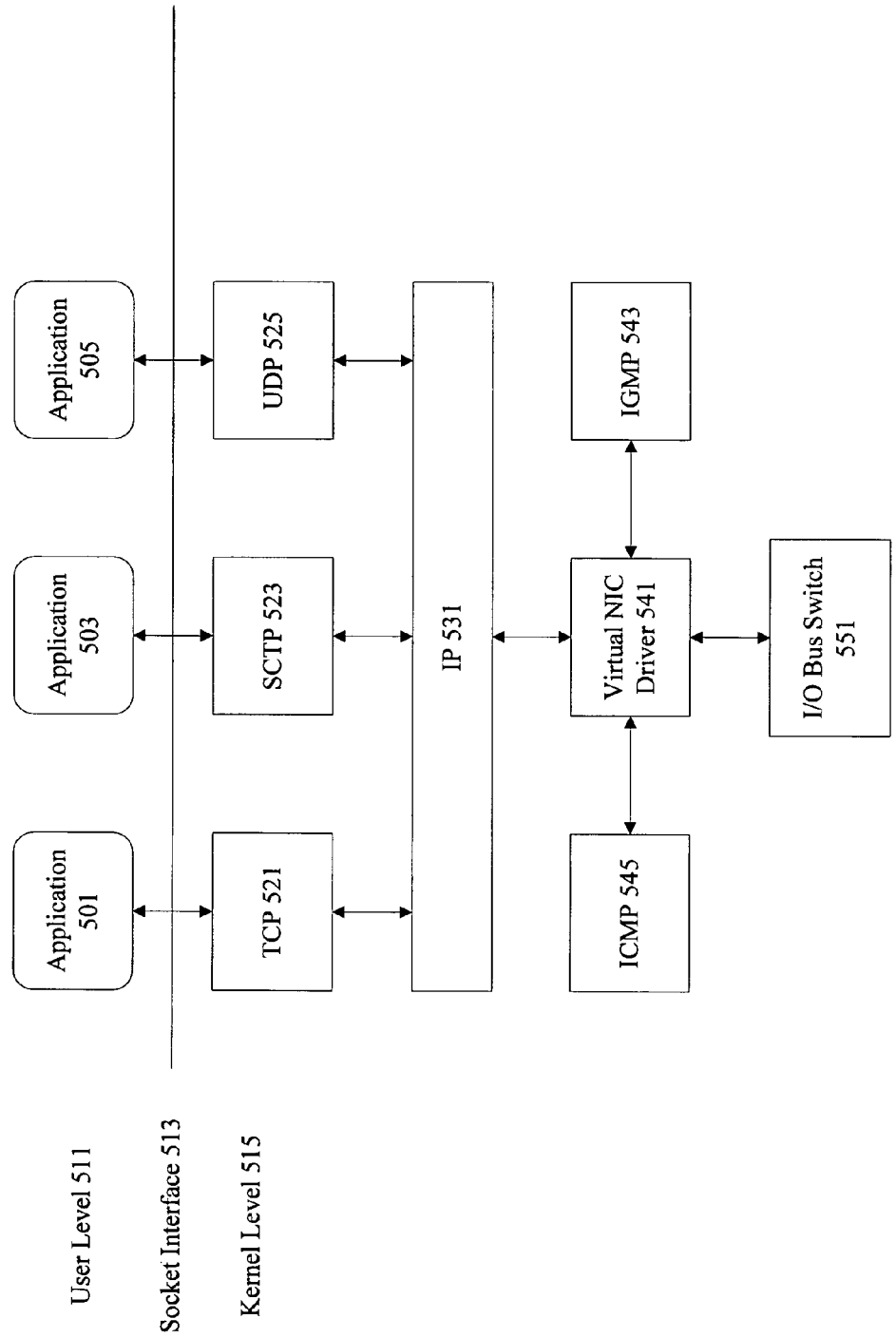
FIG. 5 is a diagrammatic representation depicting a layer model using a virtual device driver.

FIG. 5 is a diagrammatic representation showing one example of a software architecture using the interconnection mechanisms of the present invention where a virtualized MC is used for communication between servers. Although the techniques of the present invention contemplate providing direct bus level communication between servers, the techniques of the present invention recognize that for some existing applications, Ethernet over PCI Express can continue to be supported using virtualized NICs. A user level 511 includes multiple applications 501, 503, and 505. The user level 511 is coupled to a kernel level 515 through a socket interface 513. Residing at the kernel level 515 are various transport layer protocols such as a transport control protocol (TCP) 521, user datagram protocol (UDP) 525, and Stream Control Transmission Protocol (SCTP) 523. In some examples, the transport layer protocols use the network layer Internet Protocol (IP) 531 associated with a device driver. However, the device driver is no longer a conventional device driver associated with a MC or any other resource.

In some examples, the device driver is replaced with a modified device driver 541 or a virtual device driver 541 that may be associated with the Internet Control Message Protocol (ICMP) 545 and the Internet Group Management Protocol (IGMP) 543. Any device driver configured to drive a resource virtualization server is referred to herein as a modified or virtual device driver. The modified or virtual device driver 541 is configured to allow kernel access to a virtual peripheral or access to a separate server. The kernel continues to operate as though it has access to a peripheral such as a NIC card included in the server. That is, the kernel may continue to operate as though the MC can be accessed directly over the bus without using a resource virtualization server.

However, the virtual device driver supplied is actually driving access to an I/O bus switch 551 and an associated resource virtualization server. The I/O bus switch 551 and associated resource virtualization server can then perform processing to determine how to handle the request to access a particular resource such as a NIC. In some examples, the resource virtualization server can apply traffic shaping or prioritization schemes to various requests.

By using a virtualized device driver along with PCI Express as an interconnection fabric, communication between servers can be provided and resources can be virtualized in a low latency environment. Applications may continue to use a conventional network technology such as TCP/IP and a virtual MC driver 451 can automatically modify data to allow transmission on an I/O bus such as PCI Express. Hardware accelerators such as eXtensible Markup Language (XML) accelerators, security accelerators, digital signal processors (DSPs), and graphics accelerators can be virtualized while allowing rapid and efficient access in a secure local bus environment. Mainframe access using KVM can be shared. Quality of service and traffic engineering can be applied at the bus level. Furthermore, resources can be flexibly provisioned and reconfigured. Multiple VNICs can be assigned to a single application to allow for path redundancy in the event that a single MC fails.

Figure 6:
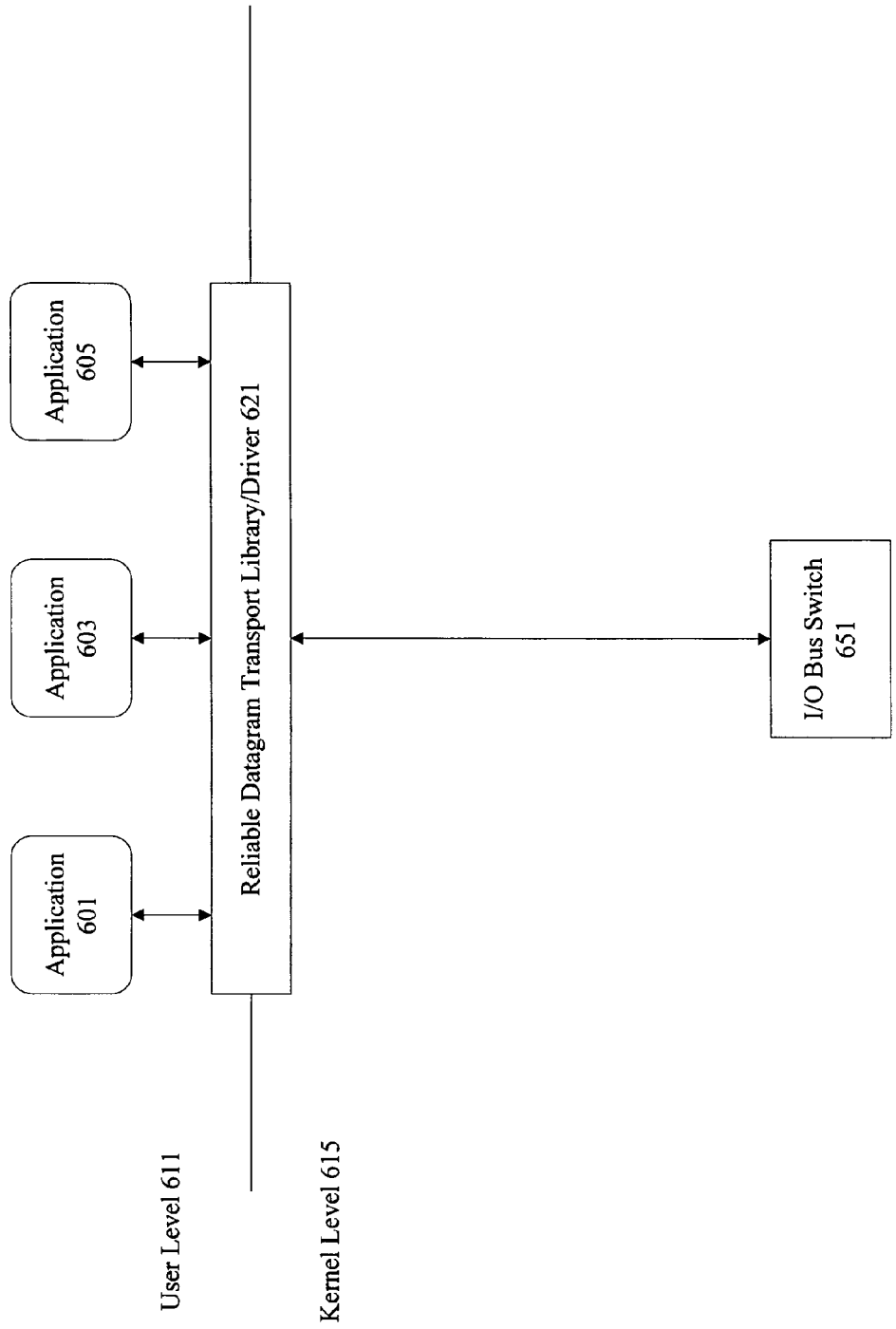
FIG. 6 is a diagrammatic representation depicting a layer model bypassing TCP/IP.

Although the techniques of the present invention contemplate allowing TCP/IP transmission over an I/O Bus such as PCI Express, the techniques and mechanisms of the present invention recognize that further efficiency can be introduced by sidestepping protocols such as TCP/IP altogether. FIG. 6 is a diagrammatic representation showing an architecture for transmitting data using an I/O bus without requiring a network stack.

A user level 611 includes multiple applications 601, 603, and 605. The user level 611 is coupled to a kernel level 615 through a socket interface 613. Residing at the kernel level 615 are portions of a reliable datagram transport library/driver 621. The reliable datagram transport library/driver 621 provides mechanisms for creating data descriptors referencing data in a memory address space, providing notification to one or more connected servers that data is available, and providing status information to a processor during a read/write transaction. In some examples, descriptors are provided on a per server basis and a per priority level basis. Reliability mechanisms and multicast support can also be provided. According to various embodiments, the reliable datagram transport library/driver 621 is a Direct Memory Access (DMA) controller. The reliable datagram transport library/driver 621 also provides mechanisms for creating data descriptors referencing data for reading and providing status information to a processor.

In some embodiments, a reliable datagram transport library/driver typically includes a send driver and a receive driver. A send driver initiates a transmission whenever the upper level software passes data to the driver. If the driver is unable to transmit the packet immediately, the supplied packet is queued in a write buffer associated with the destination server. After forwarding the packet, the send driver operates in conjunction with an interrupt service routing (ISR) and interrupts the processor to signal the end of transmission and indicate status to the processor.

A receive driver transfers data received from the bus to the memory of the host. Data is received on a read buffer associated with a receive buffer ring NIC card and transferred to memory upon accessing an ISR. The receive driver may be interrupt driven and arbitrates for access to the I/O bus. When access is available, the server reads buffer rings or descriptor queues and transfers data into its own receive buffer ring. It can then proceed to interrupt the host processor to transfer data into host memory or directly transfer data into host memory and interrupt the host processor with status information when the transfer is complete.

In one example, logic and mechanisms for I/O bus interconnection are provided on a PCI Express card. In one example, a DMA controller is placed on a PCI Express card within each computer in the cluster. The card has an external PCI Express port connected to a PCI Express switch. The DMA controller is responsible for moving data between the memories of different computers over PCI Express without introducing an additional network technology. The native PCI Express communication can be used for general-purpose networking purposes such as running TCP/IP or UDP/IP over PCI Express or providing a reliable transport protocol which can be used for supporting zero-copy networking while offloading the reliable transport protocol. Consequently, TCP/IP or UDP/IP over PCI Express as well as transmissions bypassing any network stack can be supported. Any mechanism allowing transfer of data from memory of one server to memory of another server directly without copying the data into other buffers or other portions of memory is referred to herein as zero-copy networking or zero-copy transfers. In one embodiment, TCP/UDP/IP checksum calculations are performed by the DMA controller or associated hardware. This allows more efficient data transfers and frees other resources including processor resources from performing these calculations.

Figure 7:
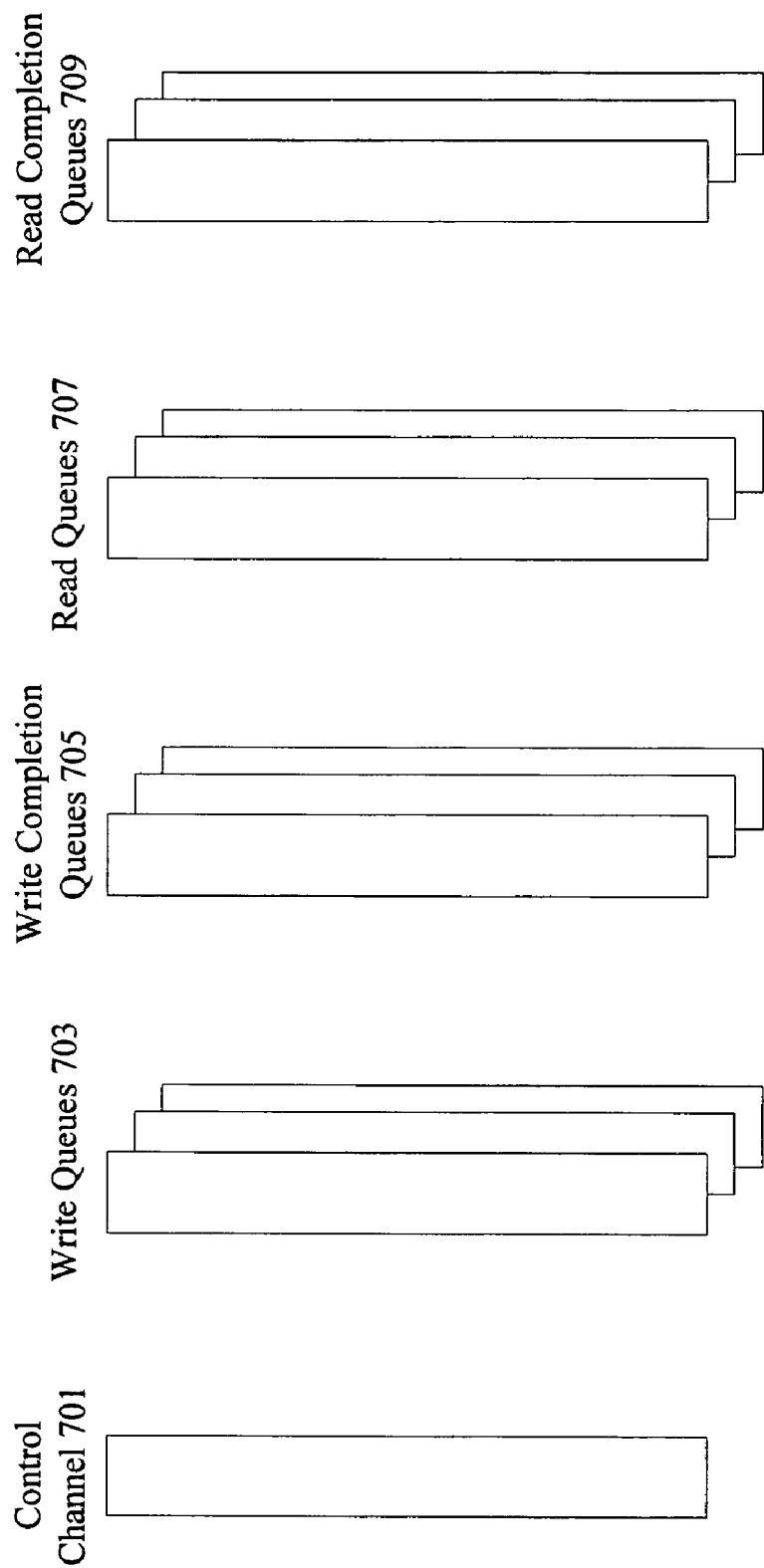
FIG. 7 is a diagrammatic representation showing a plurality of queues associated with a server.

FIG. 7 is a diagrammatic representation showing mechanisms associated with a reliable datagram transport library and driver 621 that provide support for native PCI Express communication between servers in a cluster. Although the techniques of the present invention support native transfers over PCI Express between servers that may entail additional copying into device memory, the techniques of the present invention recognize that transfers between servers over an I/O bus are made much more efficient with zero-copy transfers. In one example, efficient use of PCI Express for communication between servers involves DMA (direct memory access) capability. Although DMA controller designs for communication with I/O controllers are common, the techniques and mechanisms of the present invention provide a DMA controller design for communication between computers (cluster communication) over native PCI Express.

FIG. 7 shows multiple reliable data transfer queues that can be used to implement efficient cluster data transfers. According to various embodiments, each server includes multiple sets of queues established using a reliable datagram transport library and driver. The queues are managed in a PCI Express card. In one embodiment, a set of queues is allocated to each connected server. For example, a server connected to seven other servers would include seven sets of queues. Each set includes read and write queues such as read queues 707, read completion queues 709, write queues 703, and write completion queues 705. According to various embodiments, the read queues 707 and write queues 703 are used to post descriptors referencing data associated with cluster transfers. Read completion queues 709 and write completion queues 705 provide status indicators associated with cluster transfers. Control channel queues 701 can be used to send messages, advertise buffers, allow multicast group maintenance, configure DMA, as well as perform other configuration and management operations. Furthermore, individual queues can be further categorized based on priority to allow service differentiation. For example, a set of write queues 703 at a first server used to transfer data to a second server may include eight queues differentiated on priority level.

In one embodiment, the queues are used by a DMA controller implemented on a PCI Express card within each server in a cluster. The card is connected to the server PCI Express bus and an external PCI Express switch.

FIG. 8 is a diagrammatic representation showing examples of write and write completion descriptors used with write and write completion queues. Although common fields and parameters for descriptors are shown, it should be noted that a wide range of fields and parameters can be used. According to various embodiments, write and write completion descriptors are created during transfer of data from a server to another server. In one example, a processor initiates a transfer by supplying the memory address and length associated with the data to be transferred. In one example, the processor invokes a reliable datagram library and driver to create a write descriptor 811.

The write descriptor 811 includes a pointer to a buffer or memory address 817. The number of bytes in the buffer or memory is also provided at 815. A start of memory, middle of memory, or end of memory indicator 819 is also provided in the event that the data block is fragmented. A multicast bitmap 821 is used to indicate if more than one receiver is intended. Otherwise, the intended receiver can be determined based on the queue the write descriptor 811 is provided in. For example, the descriptor 811 may be provided in a queue for transmission to a server_08. The multicast bitmap 821 may indicate that the data should be provided to a server_06 and a server_09. The owner field 813 indicates the entity that currently owns the descriptor. Some example states include uninitialized, processor owned, DMA controller owned, and reserved. According to various embodiments, the descriptor 811 also includes a process identifier to specify a particular process associated with the data transfer. Using a process identifier, an application can quickly identify read or write data. In another example, a process identifier is not included, but the data is written into a portion of memory associated with a particular application.

After a processor posts a descriptor 811, the data transfer destination server reads the descriptor upon polling or receiving an interrupt. The destination server processor then reads the data directly from the memory of the origin server using information from the descriptor. When the transfer is complete, the transfer engine such as a DMA controller provides a write completion descriptor 831 on the associated write completion queue that is read by the processor. Consequently, a processor on a server provides the write descriptor 811 read by a DMA controller and the DMA controller on the server provides the write completion descriptor read by the processor. The write completion descriptor 831 provides a status 835 to the processor to indicate whether the data transfer was successful. In some examples, the processor is interrupted after a completion descriptor is available. Other fields for the write completion descriptor 831 include an owner field 833, a pointer to a buffer or memory 837, and a number of attempts field 839. The number of attempts 837 is provided on top of the native retransmission mechanisms available on PCI Express primarily to provide the information to a processor.

FIG. 9 is a diagrammatic representation showing examples of read descriptors and read completion descriptors. Read descriptor 911 includes a pointer to a buffer or memory 915, an owner field 913, and a buffer length 917. Read completion descriptor 931 includes a status indicator 935, valid number of bytes field 941, a pointer to a descriptor 937 and an owner field 933. A start of memory, middle of memory, and an end of memory indicator 939 are also provided. According to various embodiments, a read descriptor 911 is provided by a processor associated with a server when an interrupt triggers a read of data from another server. A transfer engine such as a DMA controller accesses the read descriptor 911 in a read descriptor queue and arbitrates for PCI Express bus access. When the transfer is complete, the DMA controller prepares a read completion descriptor to allow the processor to determine if the operation completed successfully. According to various embodiments, the DMA controller does not have control over where data is read into memory. However, in some implementations, memory locations can be advertised so that data blocks read from memory of another server can be placed in particular memory locations. In one example, memory locations are advertised using control channel buffers.

Figure 10:
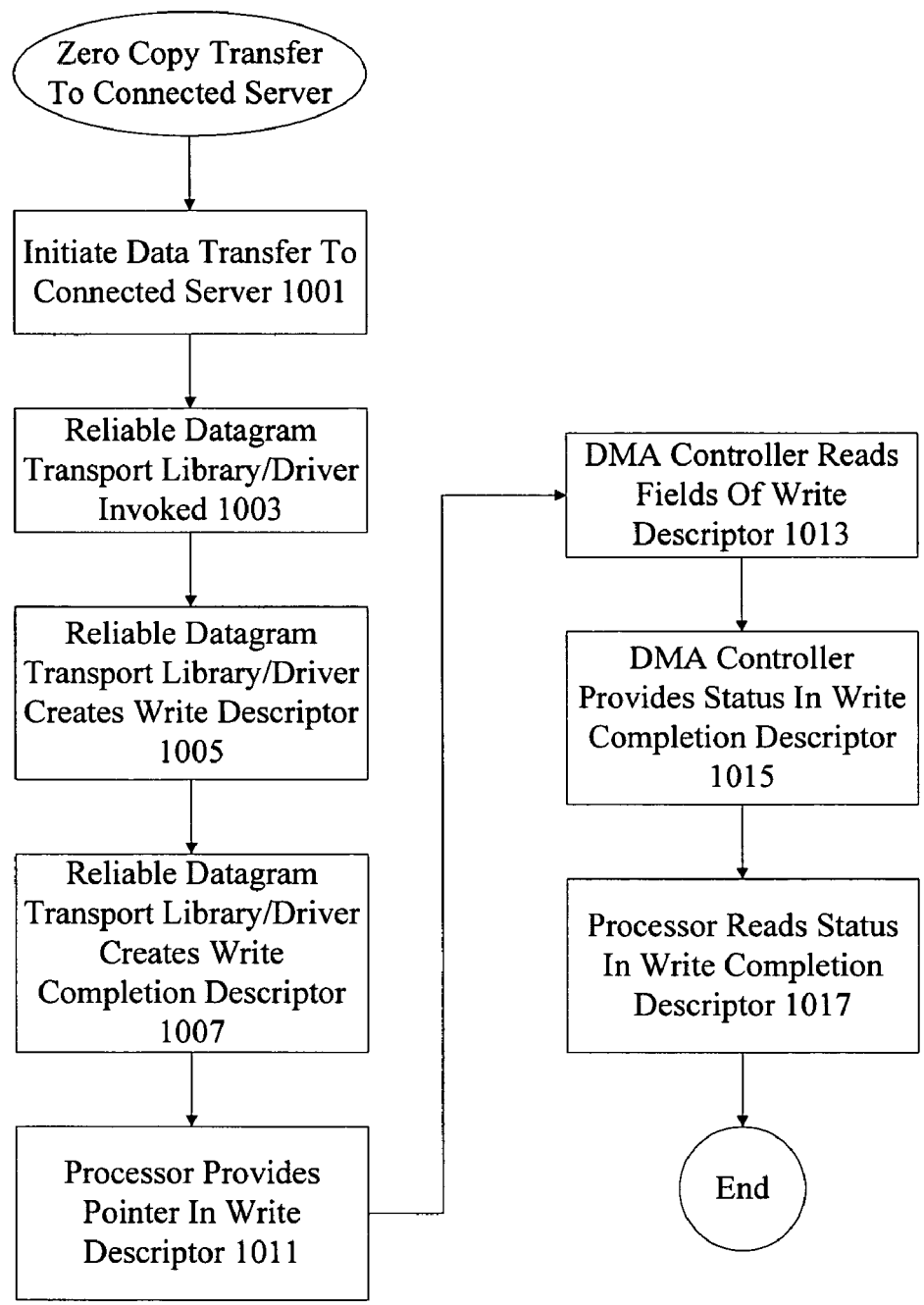
FIG. 10 is a flow process diagram showing a technique for writing data to a connected server.

FIG. 10 is a flow process diagram showing one technique for performing a zero copy transfer to a connected server. In one example, a zero copy transfer involves minimal processor involvement and a direct copy of data from one memory of one server to memory of another server without any intervening copying. At 1001, a transfer is initiated to a connected server. In one embodiment, the processor initiates the transfer by invoking a reliable datagram transfer library and driver at 1003. The reliable datagram transfer library and driver creates a write descriptor 1005. At 1007, a write completion descriptor 1007 is also created, although a write completion descriptor can also be created later. At 1011, the processor provides a pointer to the block of data in memory to be transferred. According to various embodiments, a DMA controller arbitrates for the PCI Express bus connecting the servers at 1013. After access to the bus is obtained and the transfer completes, the DMA controller provides a status in the write completion descriptor at 1015. At 1017, the processor is interrupted and determines whether the operation has completed successfully.

Figure 11:
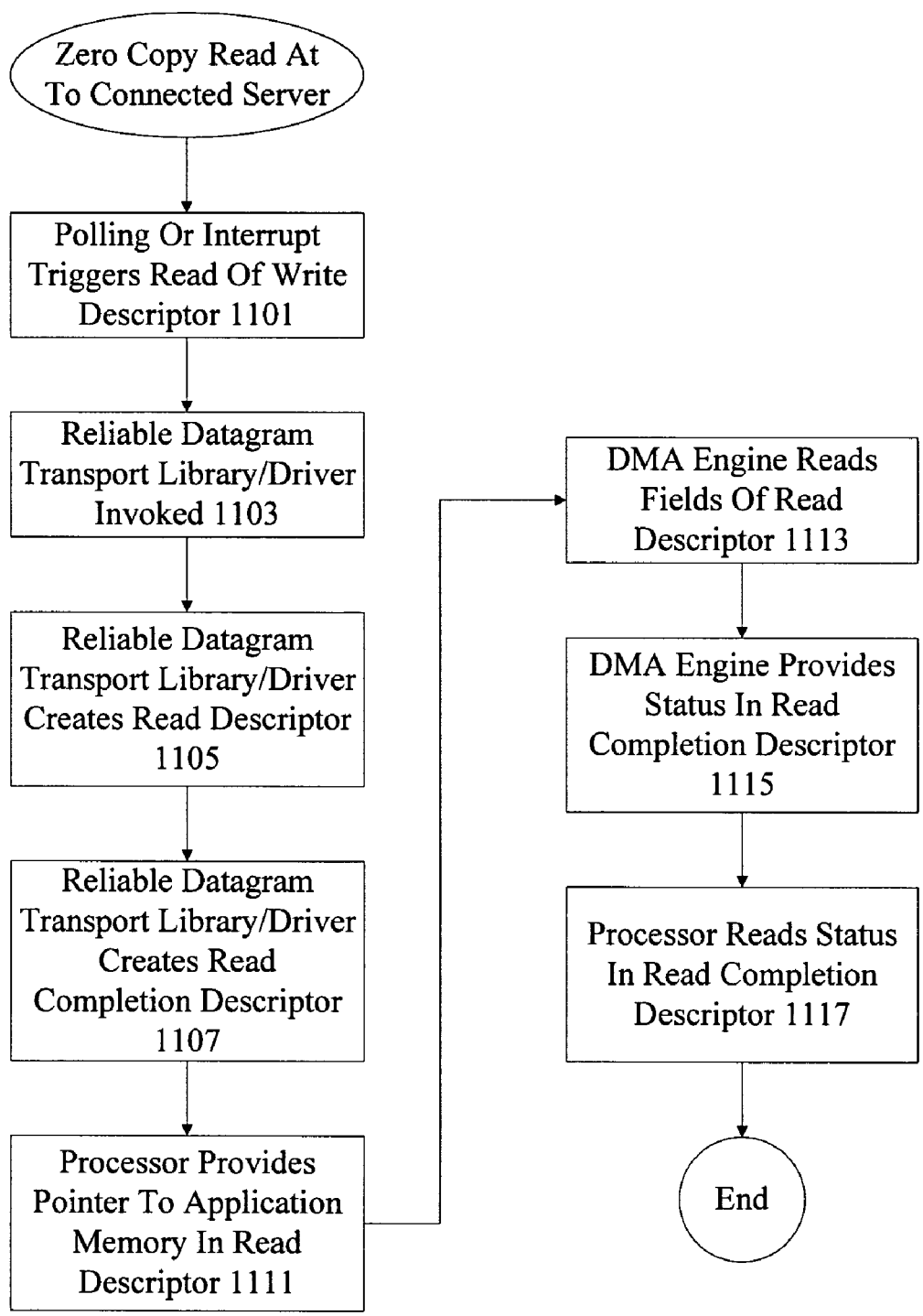
FIG. 11 is a flow process diagram showing a technique for reading data from a connected server.

FIG. 11 is a flow process diagram showing one technique for performing a zero copy read. At 1101, polling or an interrupt triggers a read. At 1103, a reliable datagram transport library and driver is invoked at 1103. At 1105 and 1107, read and read completion descriptors are created. In some examples, read and read completion descriptors have already been created. At 1111, a processor provides a pointer to memory in a write descriptor. At 1113, the DMA reads the fields of the read descriptor and arbitrates for bus access. The data is then transferred in one or more transactions. According to various embodiments, the server reading the data has no control over where the data is read into memory. However, in some embodiments, particular buffers can be advertised to allow transfer into particular locations in memory or the use of particular descriptors. At 1115, the DMA engine provides a status in the read completion descriptor and interrupts the processor. At 1117, the processor reads the status to determine if the memory transfer has completed successfully.

Figure 12:
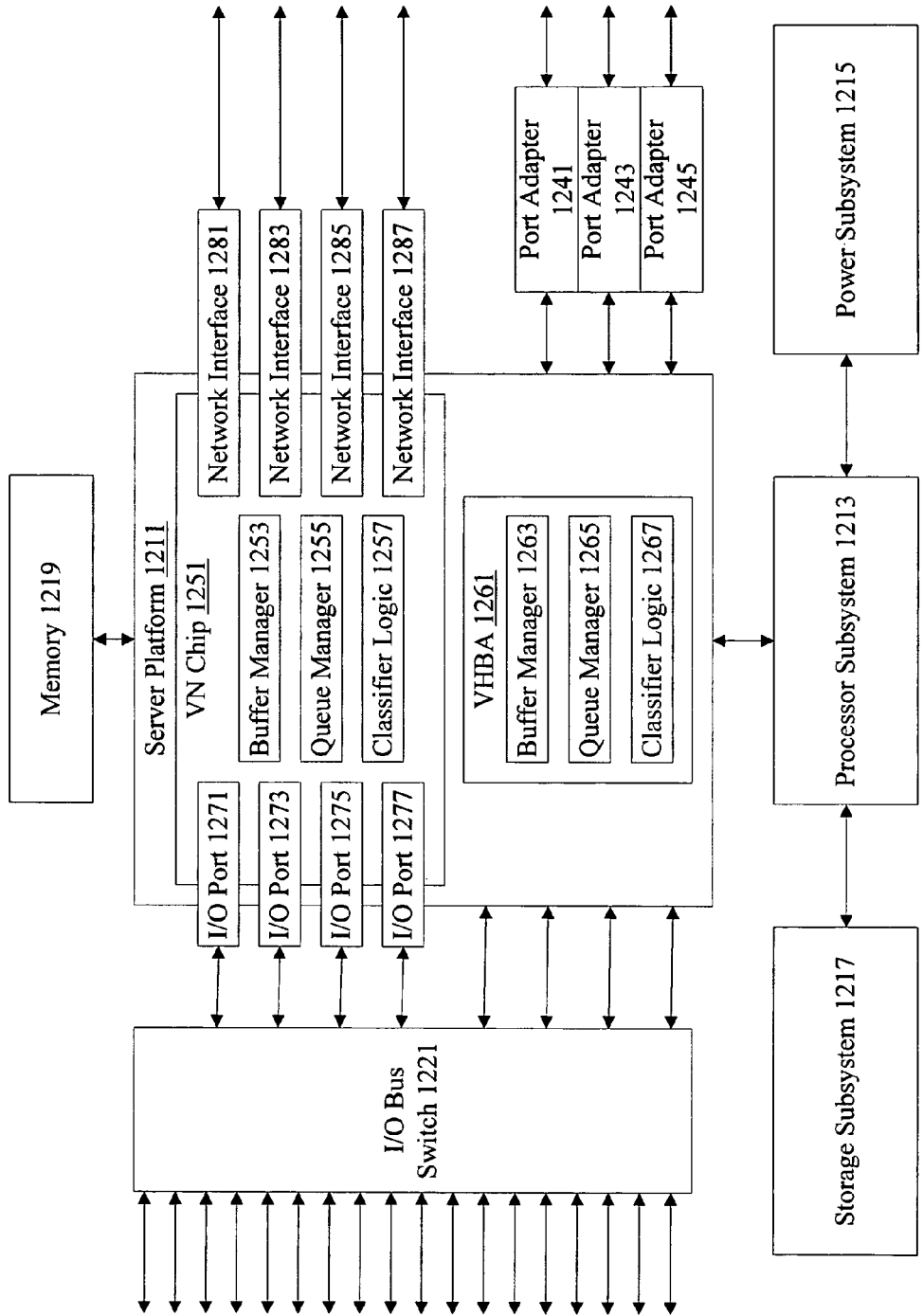
FIG. 12 is a diagrammatic representation showing one example of a system having an input/output bus switch.

FIG. 12 is a diagrammatic representation showing one example of a resource virtualization server. An I/O bus switch 1221 is connected to multiple computer systems using an I/O bus such as a PCI Express bus. Port adapters 1241-1245 are associated with multiple resources such as HBAs, sATAs, hardware accelerators, etc. According to various embodiments, a VNIC chip or VN chip 1251 has integrated port adapters in network interfaces 1281-1287. The network interfaces 1281-1287 may be MAC interfaces associated with multiple gigabyte ports. According to various embodiments, network interfaces 1281-1287 include logic mechanisms conventionally found in a MC. The server platform 1211 manages interaction between the servers connected to the I/O bus switch 1221 and various resources associated with the port adapters 1241-1245 and network interfaces 1281-1287.

The server platform 1211 is associated with memory 1219 and a processor subsystem 1213, a power subsystem 1215, and a storage subsystem 1217. In some embodiments, the server platform 1211 includes tables with information mapping various servers connected through the I/O bus switch 1221 and various port adapter resources and network interfaces. The processor subsystem 1213 is configured to manage port adapter resource as though the port adapters and network interfaces 1281-1287 were included in individual servers. In one example, the processor subsystem 1213 is configured to initialize an IP network connection regardless of whether servers have been connected to the server platform 1211.

According to various embodiments, the I/O bus switch 1221 supports flexible virtual channel configuration, high availability, and dynamic port configurations. Examples of I/O bus switches include the PCI Express switch PEX 12532 available from PLX Technology, Inc. of Sunnyvale, Calif. and the PCI Express switch PES-48G available from IMC Semiconductor of Agoura Hills, Calif.

In one embodiment, a VNIC chip or VN chip 1251 is coupled to the I/O Bus switch 1221. The VN chip 1251 has I/O ports 1271-1277 such as PCI Express interfaces coupled to the I/O bus switch 1221. The VN chip 1251 also has a connection with the processor subsystem 1213 and a series of network interfaces 1281-1287 connecting the VN chip 1251 to external network entities. In other examples, the VN chip may not include NIC interfaces and instead may be connected to conventional NICs.

The VNIC chip includes classifier logic 1247, a queue manager 1245, and a buffer manager 1243. According to various embodiments, the classifier logic 1247 includes parse and lookup logic configured to identify information such as a packet destination server and priority. Classifier logic can also be used to filter incoming data or apply traffic policing policies. In some instances, classifier logic can be used to block packets in order to implement a firewall. In one embodiment, classifier logic 1247 parses a packet and uses the information in the packet to identify entries in lookup tables. The data is then buffered. Buffer manager 1243 manages data in memory associated with the VN chip 1251. Queue manager 1245 manages descriptors for data posted. A descriptor can include a reference to a memory location, a length, a source port, and a multicast count, as well as other parameters.

In one example, classifier logic 1247 determines that the packet received is a high priority packet and should be placed in a high priority queue by the buffer manager 1243. Parameters provided may include a pointer, a length, a source port, a multicast count, and a queue identifier. The data is then placed into memory and information referencing the data such as a pointer and a length is posted into a buffer ring or a descriptor ring. When a connected server successfully arbitrates for bus access, the server reads the buffer ring or descriptor ring and obtains the data from memory associated with the VN chip. According to various embodiments, the server reads the data directly into its own memory.

Each individual server may also include descriptor queues. As will be appreciated, the servers connected to the I/O Bus Switch including the resource virtualization server arbitrate for access to the I/O Bus. When access is obtained, data can be read from memory associated with one of the server based on the information provided in the descriptor queues.

In addition, although an exemplary switch is described, the above-described embodiments may be implemented in a variety of devices (e.g., servers) as well as in a variety of mediums. For instance, instructions and data for implementing the above-described invention may be stored on a disk drive, a hard drive, a floppy disk, a server computer, or a remotely networked computer. Hardware used to implement various techniques may be embodied as racks, cards, integrated circuited devices, or portions of semiconductor chips. Accordingly, the present embodiments are to be considered as illustrative and not restrictive, and the invention is not to be limited to the details given herein, but may be modified within the scope and equivalents of the appended claims.

What is claimed is:

1. A method for transferring data between multiple separate computer systems using an I/O bus protocol, the method comprising:

reading a descriptor comprising a pointer to an address in a first computer system memory address space of a first computer system, the address corresponding to a data block address of a data block in the first computer system memory address space in a first computer system physical memory, the descriptor provided by a first computer system processor of the first computer system, wherein the descriptor is read by a second computer system connected to the first computer system over a PCI Express connection, wherein the second computer system is separate from the first computer system and comprising a second computer system DMA controller that arbitrates for access to the PCI Express connection; and upon obtaining access to the PCI Express connection, reading the data block directly from the first computer system memory address space by the second computer system DMA controller into a second computer system memory address space in a second computer system physical memory, over the PCI Express connection using information contained in the descriptor, wherein the descriptor is read by a first computer system Direct Memory Access (DMA) controller of the first computer system and wherein the first computer system DMA controller provides a write completion descriptor with status information upon detecting that the read of the data block is complete.

2. The method of claim 1, wherein a zero copy transfer is made to move the data block from the first computer system memory address space into the second computer system memory address space.

3. The method of claim 1, wherein an I/O bus connection is provided between a plurality of computer systems including the first computer system, the second computer system, and additional computer systems.

4. The method of claim 3, wherein the I/O bus connection is a PCI Express bus connection between the plurality of computer systems.

5. The method of claim 4, wherein the I/O bus connection is provided through a PCI Express switch.

6. The method of claim 1, wherein the first computer system processor reads the write completion descriptor to determine the status of the transfer.

7. The method of claim 1, wherein the first computer system processor is interrupted after the read of the data block is complete.

8. The method of claim 1, wherein data is read directly from a first computer system application memory address space of the first computer system into a second computer system application memory address space of the second computer system without involving the first and second computer system processors.

9. The method of claim 8, wherein the second computer system DMA controller provides a read completion descriptor upon determining that the read of the data block is complete.

10. The method of claim 9, wherein the second computer system processor reads the read completion descriptor to determine the status of the read of the data block.

11. The method of claim 9, wherein the second computer system processor is interrupted only after the read of the data block is complete.

12. The method of claim 11, wherein the descriptor includes a plurality of multicast flags.

13. The method of claim 1, wherein the descriptor further includes a process identifier (PID) specifying an application process associated with the data.

14. The method of claim 1, wherein the data block is read using zero-copy networking.

15. A server comprising:

a processor configured to provide a descriptor comprising a pointer to an address in a server memory address space;

memory coupled to the processor, the memory comprising the server memory address space and a data block having a data block address in the server memory address space, the data block address corresponding to the data block address; and an I/O bus interface configured to connect the server to a separate server using a PCI Express connection, the separate server comprising a separate memory address space and a separate server DMA controller to arbitrate for access to the PCI Express connection, wherein the I/O bus interface is configured to transmit the descriptor to the separate server using the PCI Express connection, wherein the I/O bus interface using the PCI Express connection is further configured to transmit the data block to the separate memory address space of the separate server over the PCI Express connection using information contained in the descriptor upon obtaining access to the PCI Express connection, wherein the descriptor is read by a Direct Memory Access (DMA) controller associated with the server, and wherein the DMA controller provides a completion descriptor with status information upon detecting that the read of the data block is complete.

16. The server of claim 15, wherein an I/O bus connection is provided between a plurality of servers.

17. The server of claim 16, wherein the I/O bus connection is provided through a PCI Express switch.

18. A computer system comprising: a processor configured to provide a descriptor comprising a pointer to an address in a first computer system memory address space of the computer system, the address corresponding to a data block address of a data block in the first computer system memory address space;

memory coupled to the processor, the memory comprising the first computer memory address space and the data block;

an I/O bus interface configured to connect the computer system to a second computer system using a PCI Express connection and to transmit the descriptor to the second computer system, wherein the second computer system is separate from the computer system and comprising a second memory address space and a second computer system DMA controller in order to arbitrate for access to the PCI Express connection, wherein the I/O bus interface is further configured to transmit the data block from the first computer system memory address space into the second computer memory address space of the second computer system over the PCI Express connection using information contained in the descriptor, upon obtaining access to the PCI Express connection; and a Direct Memory Access (DMA) controller, wherein the descriptor is read by the DMA controller, and wherein the DMA controller provides a completion descriptor with status information upon detecting that the read of the data block is complete.

19. The computer system of claim 18, wherein the processor reads the completion descriptor to determine the status of the transfer.

20. The method of claim 1, wherein the descriptor further comprises one or more fields selected from the group consisting of a number of bytes in the data block, a start memory indicator, a middle memory indicator, an end memory indicator, a multicast bitmap, and a process identifier.

21. The method of claim 1, wherein the read descriptor comprises one or more fields selected from the group consisting of the pointer to the address in the first computer system memory address space of the first computer system, an owner field, and a buffer length field.

22. The method of claim 1, wherein the write completion descriptor comprises one or more fields selected from the group consisting of a status field, an owner field, the first computer system memory address space of the first computer system, and a number of attempts field.

23. The method of claim 9, wherein the read completion descriptor comprises one or more fields selected from the group consisting of a status inductor field, a valid number of bytes field, a pointer to the read descriptor, and an owner field.

* * * * *